United States Patent
Jun

(10) Patent No.: US 9,010,092 B2
(45) Date of Patent: Apr. 21, 2015

(54) METHOD AND APPARATUS FOR CONTROLLING UREA INJECTION AMOUNT OF VEHICLE

(71) Applicants: Hyundai Motor Company, Seoul (KR); Kia Motors Corporation, Seoul (KR)

(72) Inventor: Daesu Jun, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/064,788

(22) Filed: Oct. 28, 2013

(65) Prior Publication Data

US 2014/0182269 A1  Jul. 3, 2014

(30) Foreign Application Priority Data

Dec. 31, 2012  (KR) .................. 10-2012-0158624

(51) Int. Cl.

| F01N 3/035 | (2006.01) |
|---|---|
| F01N 9/00 | (2006.01) |
| F01N 3/20 | (2006.01) |
| F01N 3/029 | (2006.01) |

(52) U.S. Cl.
CPC .............. F01N 9/00 (2013.01); F01N 3/2066 (2013.01); F01N 3/208 (2013.01); F01N 9/002 (2013.01); F01N 3/029 (2013.01); F01N 3/035 (2013.01); F01N 2560/06 (2013.01); F01N 2610/02 (2013.01); F01N 2900/1602 (2013.01)

(58) Field of Classification Search
CPC ............ F01N 3/208; F01N 2900/1602; F01N 11/002; F01N 2610/02; F01N 2900/1402; F01N 2900/1818; F01N 3/035

USPC .......... 60/274, 277, 286, 295, 297, 298, 301, 60/320

See application file for complete search history.

(56) References Cited

U.S. PATENT DOCUMENTS

2011/0047991 A1* 3/2011 Kato .............................. 60/297

FOREIGN PATENT DOCUMENTS

| DE | 10 2008 032 332 A1 | 8/2009 |
|---|---|---|
| GB | 2 454 341 A | 5/2009 |
| JP | 2006-274986 A | 10/2006 |
| JP | 2008-138619 A | 6/2008 |
| JP | 2011-52610 A | 3/2011 |

* cited by examiner

Primary Examiner — Thomas Denion
Assistant Examiner — Jorge Leon, Jr.
(74) Attorney, Agent, or Firm — Morgan, Lewis & Bockius LLP

(57) ABSTRACT

A method is provided for controlling a urea injection amount of a vehicle that controls urea injection in consideration of a difference between an internal temperature change rate and a regeneration temperature of an SCR integral diesel particulate filter. The method includes: detecting a regeneration temperature rising rate when in a regeneration mode; stopping, if a regeneration temperature rising rate exceeds a predetermined first reference, injection of urea, and controlling, if a regeneration temperature rising rate is less than a predetermined first reference, urea injection; controlling, if a temperature decreasing rate according to urea injection is less than a predetermined second reference while regenerating the filter, correction of an injection amount of urea; and controlling, if a difference between a target regeneration temperature and an actual regeneration temperature exceeds a predetermined third reference according to urea injection while regenerating the filter, correction of an injection amount of urea.

12 Claims, 2 Drawing Sheets

METHOD AND APPARATUS FOR CONTROLLING UREA INJECTION AMOUNT OF VEHICLE

CROSS-REFERENCE TO RELATED APPLICATION

The present application claims priority of Korean Patent Application Number 10-2012-0158624 filed Dec. 31, 2012, the entire contents of which application is incorporated herein for all purposes by this reference.

BACKGROUND OF INVENTION

1. Field of Invention

The present invention relates to an apparatus and method for controlling a urea injection amount of a vehicle that controls urea injection in consideration of a difference between an internal temperature change rate and a regeneration temperature of an SCR integral diesel particulate filter that is mounted in a diesel vehicle.

2. Description of Related Art

In order to purify NOx, an SCR catalyst receives urea from an injector that is disposed at the front end thereof and acquires ammonia that is generated according to evaporation and decomposition of the injected urea.

In order to provide cost reduction, weight reduction, and efficient package of an aftertreatment device, an SCR integral diesel particulate filter is applied.

The SCR integral diesel particulate filter is an aftertreatment device that coats an existing diesel particulate filter with an NOx purifying function catalyst and removes an SCR carrier and canning, compared with an aftertreatment device in which an SCR catalyst and a diesel particulate filter are separated and thus a weight thereof is reduced, and accordingly a cost can be reduced and fuel consumption can be improved.

In the SCR integral diesel particulate filter, because an SCR catalyst may be moved and mounted at the upstream side of an exhaust pipe, a heat-up function for securing an NOx purifying performance is unnecessary and thus an NOx purification performance can be improved and fuel consumption can be enhanced.

Because the SCR integral diesel particulate filter receives urea at the front end of a diesel particulate filter, it is necessary to control urea injection timing/injection amount in consideration of regeneration temperature control precision by urea injection while regenerating.

When urea is injected while regenerating the SCR integral diesel particulate filter, a regeneration temperature is deteriorated by an increase of a heat capacity of an exhaust gas and thus when increasing a urea injection amount to a predetermined amount or more, in order to secure a target regeneration temperature, a fuel injection amount should be additionally increased and thus fuel consumption is worsened.

Further, at the rear end of the diesel oxidation catalyst, as a slip amount of HC increases, an internal temperature of the SCR integral diesel particulate filter rises, and when abnormal regeneration occurs, a temperature sharply rises and thus degradation of an SCR catalyst may be promoted and the filter may be damaged.

Examples of known devices include Japanese Patent Laid-Open Publication No. 2006-274986 (Oct. 12, 2006) and Japanese Patent Laid-Open Publication No. 2011-052610 (Mar. 17, 2011).

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an apparatus and method for controlling a urea injection amount of a vehicle having advantages of improving fuel consumption and preventing catalyst degradation and filter damage by determining whether to inject urea by analyzing a regeneration temperature rising rate after entering a regeneration mode of an SCR integral diesel particulate filter and by correcting a urea injection amount by analyzing a decreasing rate of a regeneration temperature and a difference between a target regeneration temperature and an actual regeneration temperature when injection of urea is executed.

Various aspects of the present invention provide for a urea injection control apparatus of a vehicle including: an SCR integral diesel particulate filter that purifies NOx by a reduction reaction of NOx that is included in an exhaust gas of an engine and ammonia that is acquired from urea and that collects PM; a temperature sensor that detects a temperature change of the SCR integral diesel particulate filter; an injector that injects urea to the front end of the SCR integral diesel particulate filter; and a control unit that controls injection of urea by analyzing a temperature rising rate from information that is provided from the temperature sensor in a regeneration mode of the SCR integral diesel particulate filter and that corrects an injection amount of urea by analyzing a regeneration temperature decreasing rate and a difference between a target regeneration temperature and an actual regeneration temperature changing according to injection of urea.

The control unit may control urea injection, if a temperature rising rate according to rise of a regeneration temperature is less than a predetermined first reference (A° C./sec), after the SCR integral diesel particulate filter enters a regeneration mode.

The control unit may set the first reference (A° C./sec) to 2.5° C./sec.

The control unit may control correction of a urea injection amount, if a decreasing rate of a regeneration temperature is less than a predetermined second reference (−A° C./sec) by urea injection while regenerating the SCR integral diesel particulate filter.

The control unit may control correction of a urea injection amount, if a difference between a target regeneration temperature and an actual regeneration temperature exceeds a third reference (B° C.) according to urea injection while regenerating the SCR integral diesel particulate filter.

The control unit may set the second reference (−A° C./sec) to −2.5° C./sec and set the third reference (B° C.) to 50° C.

The control unit may calculate a necessary amount of ammonia (NH3) that is requested by the SCR integral diesel particulate filter based on a ratio of ammonia (NH3) and NOx, a mass flow velocity of NOx, and a reaction rate function of ammonia (NH3).

The control unit may calculate a necessary amount of urea by calculating a necessary amount of ammonia (NH3)×a molecular weight ratio (urea/NH3)÷a urea mass fraction within urea.

Various aspects of the present invention provide for a method of controlling urea injection of a vehicle including: a first process of detecting a regeneration temperature rising rate when an SCR integral diesel particulate filter enters a regeneration mode; a second process of stopping, if a regeneration temperature rising rate of the SCR integral diesel particulate filter exceeds a predetermined first reference, urea injection, and controlling, if a regeneration temperature rising rate of the SCR integral diesel particulate filter is less than a predetermined first reference, urea injection; a third process of controlling, if a temperature decreasing rate according to urea injection is less than a predetermined second reference while regenerating the SCR integral diesel particulate filter, correction of an injection amount of urea; and a fourth process of controlling, if a difference between a target regeneration temperature and an actual regeneration temperature exceeds a predetermined third reference according to urea injection while regenerating the SCR integral diesel particulate filter, correction of a urea injection amount.

The method may further include a process of stopping control of a urea injection amount, if a temperature decreasing rate according to urea injection while regenerating the SCR integral diesel particulate filter exceeds a predetermined second reference in the third process or if a difference between a target regeneration temperature and an actual regeneration temperature is less than a third reference in the fourth process.

In the second process, an ammonia (NH3) necessary amount that is requested by the SCR integral diesel particulate filter may be calculated based on a ratio of ammonia (NH3) and NOx, a mass flow velocity of NOx, and a reaction rate function of ammonia (NH3), and a urea necessary amount may be calculated based on a necessary amount of ammonia (NH3)×a molecular weight ratio (urea/NH3)÷a urea mass fraction within urea.

In this way, in the present invention, by mounting an SCR integral diesel particulate filter, a cost is reduced, a weight decreases, and fuel efficiency is enhanced, and when urea is injected while regenerating the SCR integral diesel particulate filter, by correcting a urea injection amount according to a temperature condition within a catalyst, fuel consumption can be improved, and degradation of a catalyst and damage of a filter can be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
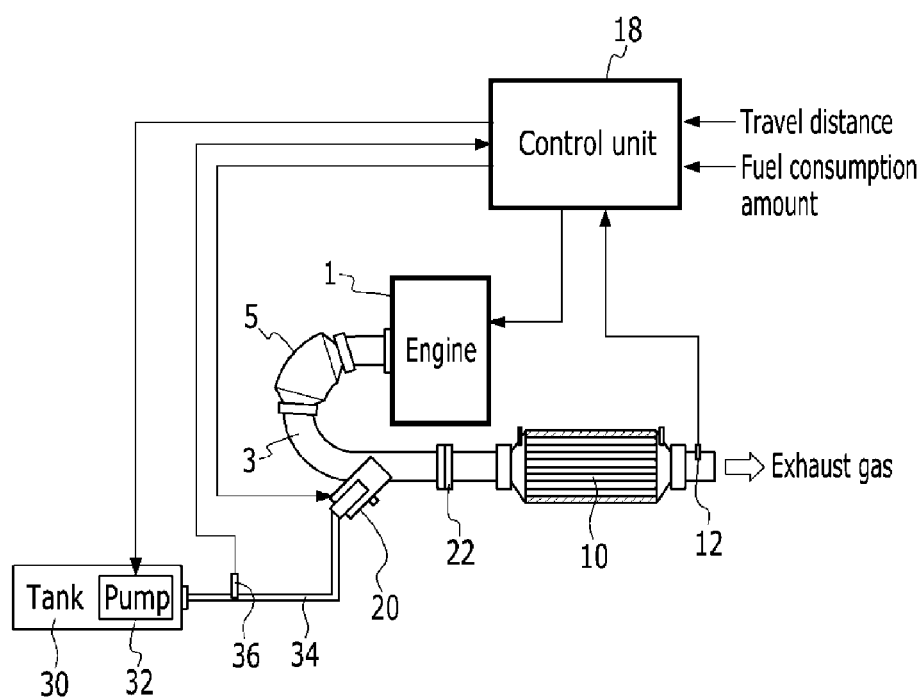
FIG. 1 is a diagram illustrating an exemplary urea injection control apparatus of a vehicle according to the present invention.
Figure 2:
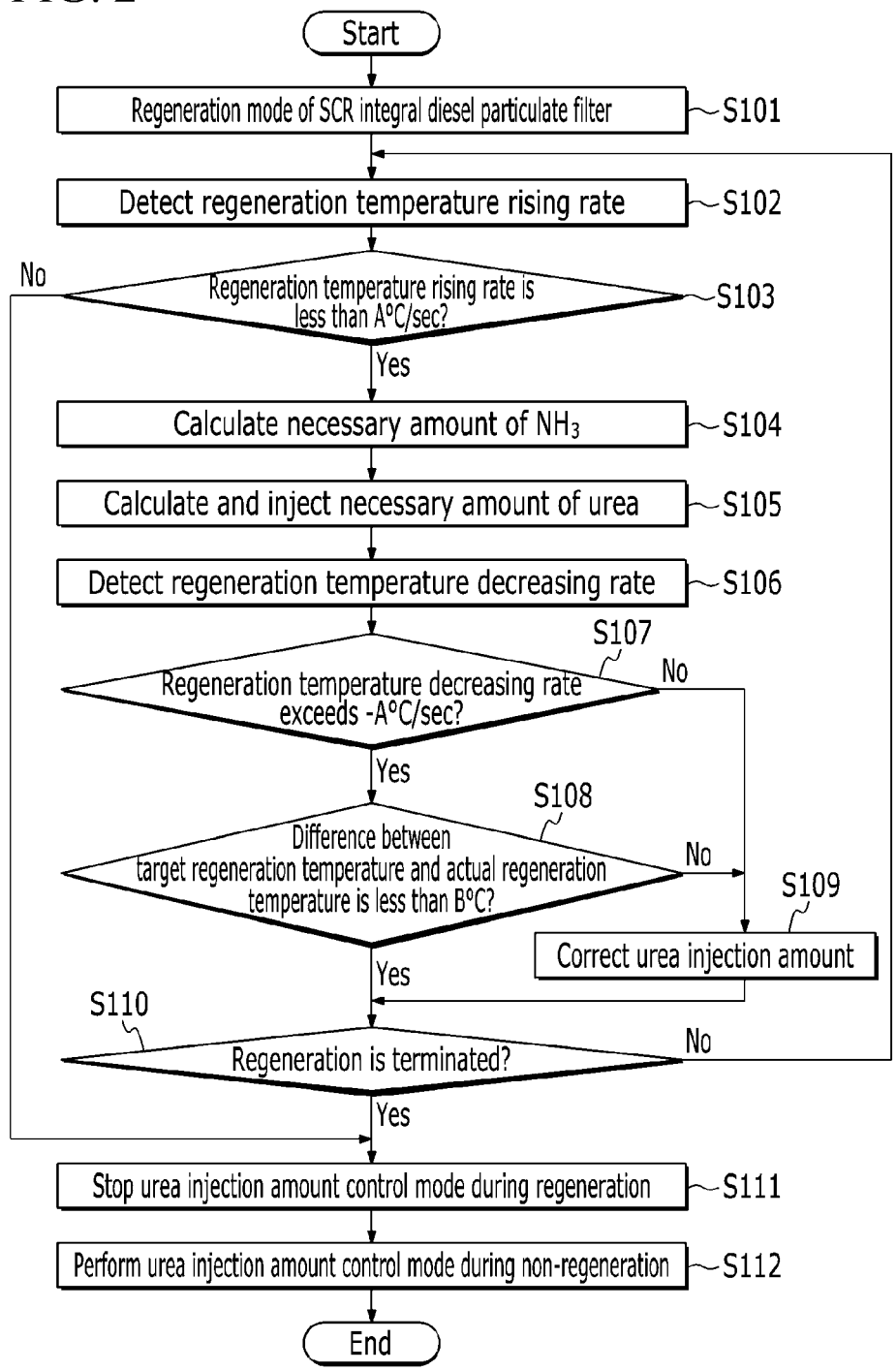
FIG. 2 is a flowchart illustrating an exemplary urea injection control procedure of a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto.

FIG. 1 is a diagram illustrating a urea injection control apparatus of a vehicle according to various embodiments of the present invention.

Referring to FIG. 1, the urea injection control apparatus of a vehicle according to various embodiments of the present invention includes an engine 1, an exhaust pipe 3, a diesel oxidation catalyst 5, an SCR integral diesel particulate filter 10, a temperature sensor 12, a control unit 18, an injector 20, a mixer 22, a urea tank 30, a pump 32, a urea supply line 34, and a pressure sensor 36.

The diesel oxidation catalyst 5 is mounted adjacent to the engine 1 to purify NOx that is included in an exhaust gas through an oxidation reaction.

The SCR integral diesel particulate filter 10 is formed by coating the inside of a general diesel particulate filter with a material such as $V_2O_5/TiO_2$, $Pt/Al_2O_3$, or zeolite, purifies NOx by a reduction reaction of ammonia and NOx that are acquired from urea that is injected from the injector 20, and prevents a particulate material from being exhausted by collecting PM.

The temperature sensor 12 detects a temperature change of the SCR integral diesel particulate filter 10 and provides the temperature change to the control unit 18.

When the SCR integral diesel particulate filter 10 enters a regeneration mode, the control unit 18 determines whether to inject urea by analyzing a temperature rising rate from information that is provided by the temperature sensor 12, and corrects a urea injection amount by analyzing a difference between an actual regeneration temperature and a target regeneration temperature and a regeneration temperature decreasing rate of the SCR integral diesel particulate filter 10 changing according to urea injection.

After the SCR integral diesel particulate filter 10 enters a regeneration mode, when a temperature rising rate according to rise of a regeneration temperature is less than a predetermined first reference, for example 2.5° C./sec, the control unit 18 injects urea.

If a decreasing rate of a regeneration temperature is less than a predetermined second reference, for example, −2.5° C./sec or if a difference between a target regeneration temperature and an actual regeneration temperature exceeds a third reference, for example, 50° C. by urea injection while regenerating the SCR integral diesel particulate filter 10, the control unit 18 corrects a urea injection amount.

The control unit 18 calculates a necessary amount of ammonia (NH3) that is requested by the SCR integral diesel particulate filter 10 based on a ratio of ammonia (NH3) and NOx, a mass flow velocity of NOx, and a reaction rate function of ammonia (NH3).

The control unit 18 calculates a urea necessary amount based on the calculated necessary amount of ammonia (NH3)×a molecular weight ratio (urea/NH3)÷a urea mass fraction within urea.

The control unit 18 corrects a urea injection amount with a decreasing rate of a regeneration temperature and a function of a target regeneration temperature-actual regeneration temperature.

The injector 20 injects the calculated urea amount in a high pressure by operation of an injector according to a pulse width modulation (PWM) signal injector that is applied in the control unit 18.

The mixer 22 is disposed between the injector 20 and the SCR integral diesel particulate filter 10 to perform a function of splitting a particle by colliding urea particles that are injected through the injector 20 and optimally mixes ammonia that is generated from urea and NOx within an exhaust gas by evenly mixing an exhaust gas and a urea particle.

The urea tank 30 houses urea for injecting and forms a predetermined uniform pressure in the urea supply line 34 by driving the pump 32 that is mounted at the inside.

As the pressure sensor 36 detects a pressure that is formed in the urea supply line 34 and provides information thereof to the control unit 18, in a state in which the engine 1 maintains starting, the pressure sensor 36 enables the urea supply line 34 to always maintain a predetermined pressure.

Operation of a urea injection control apparatus of a vehicle according to the present invention having the foregoing function is performed as follows.

When the SCR integral diesel particulate filter 10 enters a regeneration mode according to operation of a diesel vehicle in which the SCR integral diesel particulate filter 10 according to various embodiments of the present invention is mounted (S101), the control unit 18 detects a temperature rising rate according to information that is provided by the temperature sensor 12 (S102).

The temperature rising rate may be detected as a rising rate of the temperature per unit time.

The control unit 18 determines whether a temperature rising rate of the SCR integral diesel particulate filter 10 is less than a predetermined first reference (A° C./sec), for example, 2.5° C./sec at step S103.

If a temperature rising rate exceeds a predetermined first reference (A° C./sec) at step S103, the control unit 18 stops urea injection control (S111).

If a temperature rising rate is less than a predetermined first reference (A° C./sec) at step S103, the control unit 18 calculates a necessary amount of ammonia (NH3) that is requested by the SCR integral diesel particulate filter 10 based on a ratio of ammonia (NH3) and NOx, a mass flow velocity of NOx, and a reaction rate function of ammonia (NH3) (S104).

The control unit 18 calculates a necessary amount of urea based on a necessary amount of ammonia (NH3)×a molecular weight ratio (urea/NH3)÷a urea fraction within urea that is calculated at step S104 and injects the calculated urea amount by controlling the injector 20 (S105).

The control unit 18 detects a regeneration temperature decreasing rate according to urea injection while regenerating the SCR integral diesel particulate filter 10 (S106) and determines whether the regeneration temperature decreasing rate is less than a predetermined second reference (−A° C./sec), for example, −2.5° C./sec (S107).

The regeneration temperature decreasing rate may be detected with a decrease change of a temperature per unit time.

If a decreasing rate of a regeneration temperature exceeds a predetermined second reference (−A° C./sec), for example, −2.5° C./sec according to urea injection while regenerating the SCR integral diesel particulate filter 10 at step S107, the control unit 18 determines whether a difference between a target regeneration temperature and an actual regeneration temperature exceeds a third reference (B° C.), for example, 50° C. (S108).

If a decreasing rate of a regeneration temperature according to urea injection while regenerating the SCR integral diesel particulate filter 10 is less than a predetermined second reference (−A° C./sec), for example, −2.5° C./sec at step S107, or if a difference between a target regeneration temperature and an actual regeneration temperature exceeds a third reference (B° C.), for example 50° C. at step S108, the control unit 18 corrects a urea injection amount according to a decreasing rate of a regeneration temperature (S109).

In a process of injecting urea to the SCR integral diesel particulate filter 10 or correcting a urea injection amount according to the procedure, the control unit 18 determines whether regeneration termination of the SCR integral diesel particulate filter 10 is detected (S110).

If regeneration termination of the SCR integral diesel particulate filter 10 is not detected, the process returns to step S102, if regeneration termination is detected, the control unit 18 stops a urea injection amount control mode during regeneration (S111) and converts the mode to a urea injection amount control mode during non-regeneration (S112).

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A urea injection control apparatus of a vehicle, comprising:
    an SCR integral diesel particulate filter that purifies NOx and that collects PM;
    a temperature sensor that detects a temperature change of the SCR integral diesel particulate filter;
    an injector that injects urea to a front end of the SCR integral diesel particulate filter; and
    a control unit that controls injection of urea by analyzing a temperature rising rate from information that is provided from the temperature sensor in a regeneration mode of the SCR integral diesel particulate filter and that corrects a urea injection amount by analyzing a regeneration temperature decreasing rate and a difference between a target regeneration temperature and an actual regeneration temperature changing according to injection of urea.

2. The urea injection control apparatus of claim 1, wherein the control unit controls urea injection, when a temperature rising rate according to a rise of a regeneration temperature is less than a predetermined first reference (A° C./sec), after the SCR integral diesel particulate filter enters the regeneration mode.

3. The urea injection control apparatus of claim 2, wherein the control unit sets the predetermined first reference (A° C./sec) to 2.5° C./sec.

4. The urea injection control apparatus of claim 1, wherein the control unit controls correction of the urea injection amount, when the regeneration temperature decreasing rate is less than a predetermined second reference (−A° C./sec) by urea infection while regenerating the SCR integral diesel particulate filter.

5. The urea injection control apparatus of claim 4, wherein the control unit controls correction of the urea injection amount, when the difference between the target regeneration temperature and the actual regeneration temperature exceeds a third reference (B° C.) according to urea injection while regenerating the SCR integral diesel particulate filter.

6. The urea injection control apparatus of claim 5, wherein the control unit sets the second reference (−A° C./sec) to −2.5° C./sec and sets the third reference (B° C.) to 50° C.

7. The urea injection control apparatus of claim 1, wherein the control unit calculates a necessary amount of ammonia (NH3) that is requested by the SCR integral diesel particulate filter based on a ratio of ammonia (NH3) and NOx, a mass flow velocity of NOx, and a reaction rate function of ammonia (NH3).

8. The urea injection control apparatus of claim 7, wherein the control unit calculates a necessary amount of urea by calculating the calculated necessary amount of ammonia (NH3)×a molecular weight ratio (urea/NH3)÷a urea mass fraction within urea.

9. A method of controlling urea injection of a vehicle, the method comprising:
detecting a regeneration temperature rising rate when an SCR integral diesel particulate filter enters a regeneration mode;
stopping injection of urea, when the regeneration temperature rising rate of the SCR integral diesel particulate filter exceeds a predetermined first reference, and then controlling urea injection, when the regeneration temperature rising rate of the SCR integral diesel particulate filter is less than the predetermined first reference;
controlling correction of an injection amount of urea, when the temperature decreasing rate according to urea injection is less than a predetermined second reference while regenerating the SCR integral diesel particulate filter; and
correction of an injection amount of urea when a difference between a target regeneration temperature and an actual regeneration temperature exceeds a predetermined third reference according to urea injection while regenerating the SCR integral diesel particulate filter.

10. The method of claim 9, further comprising
stopping control of the injection amount of urea, when the temperature decreasing rate according to urea injection while regenerating the SCR integral diesel particulate filter exceeds the predetermined second reference or when the difference between the target regeneration temperature and the actual regeneration temperature is less than the predetermined third reference.

11. The method of claim 9, wherein the controlling urea injection comprises:
calculating an ammonia (NH3) necessary amount that is requested by the SCR integral diesel particulate filter based on a ratio of ammonia (NH3) and NOx, a mass flow velocity of NOx, and a reaction rate function of ammonia (NH3), and
calculating a urea necessary amount by calculating the calculated ammonia (NH3) necessary amount×a molecular weight ratio (urea/NH3)÷a urea mass fraction within urea.

12. A urea injection control apparatus of a vehicle, comprising:
an SCR integral diesel particulate filter;
a temperature sensor that detects a temperature change of the SCR integral diesel particulate filter;
an injector that injects urea to the SCR integral diesel particulate filter; and
a control unit that controls urea injection,
wherein the control unit operates according to a predetermined program to control urea injection according to a temperature change in a regeneration mode of the SCR integral diesel particulate filter, and
wherein the predetermined program comprises:
detecting a regeneration temperature rising rate when the SCR integral diesel particulate filter enters the regeneration mode;
stopping-injection of urea, when the regeneration temperature rising rate of the SCR integral diesel particulate filter exceeds a predetermined first reference, and then controlling urea injection when a regeneration temperature rising rate of the SCR integral diesel particulate filter is less than the predetermined first reference;
controlling correction of an injection amount of urea, when the temperature decreasing rate according to urea injection is less than a predetermined second reference while regenerating the SCR integral diesel particulate filter; and
controlling correction of an injection amount of urea when a difference between a target regeneration temperature and an actual regeneration temperature exceeds a predetermined third reference according to urea injection while regenerating the SCR integral diesel particulate filter.

* * * * *